（12）United States Patent
Itoh (10) Patent No.: US 8,151,102 B2
(45) Date of Patent: Apr. 3, 2012

(54) SYSTEM AND METHODS FOR BOOTING ELECTRONIC DEVICES

(75) Inventor: Hiroshi Itoh, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 452 days.

(21) Appl. No.: 12/412,758

(22) Filed: Mar. 27, 2009

(65) Prior Publication Data

US 2009/0249055 A1    Oct. 1, 2009

(30) Foreign Application Priority Data

Apr. 1, 2008 (JP) ................................. 2008-094502

(51) Int. Cl.
| G06F 9/00 | (2006.01) |
| G06F 13/00 | (2006.01) |
| G06F 12/00 | (2006.01) |
| G06F 11/00 | (2006.01) |
| G06F 9/44 | (2006.01) |
| G06F 9/445 | (2006.01) |

(52) U.S. Cl. ............... 713/2; 713/1; 710/104; 711/118; 711/137; 714/36; 717/168; 717/174

(58) Field of Classification Search ................. 713/1, 2; 710/104; 711/118, 137; 714/36; 717/168, 717/174

See application file for complete search history.

(56) References Cited

U.S. PATENT DOCUMENTS

| 6,073,232 | A | 6/2000 | Kroeker et al. |
| 6,920,533 | B2 * | 7/2005 | Coulson et al. ................ 711/145 |
| 7,181,608 | B2 * | 2/2007 | Fallon et al. ...................... 713/2 |
| 2008/0209198 | A1 * | 8/2008 | Majni et al. ...................... 713/2 |
| 2008/0256295 | A1 | 10/2008 | Lambert |
| 2009/0158023 | A1 * | 6/2009 | Kern ................................. 713/2 |

FOREIGN PATENT DOCUMENTS

| JP | S64-076314 | 3/1989 |
| JP | H07-036784 | 2/1995 |
| JP | 2001-350669 | 12/2001 |
| JP | 2002-207635 | 7/2002 |
| JP | 2004-030184 | 1/2004 |
| JP | 2007-179089 | 7/2007 |
| JP | 2007-241927 | 9/2007 |
| JP | 2007-526556 | 9/2007 |

* cited by examiner

*Primary Examiner* — Stefan Stoynov (74) *Attorney, Agent, or Firm* — Ference & Associates LLC (57) ABSTRACT

The invention provides a boot method capable of reducing boot time even in the case of a change in the configuration of boot files. A boot file is booted from a hard disk drive in a computer equipped with a multitasking operating system. A plurality of tasks are observed, the tasks being created and sequentially executed in order to read out boot files. This observation is carried out at the corresponding boot and a log in the past boot is not used. On the basis of the observed boot files, a prefetch boot file is selected. The entire selected prefetch boot file is filled into a boot cache. The boot file is loaded from the boot cache to a main memory.

20 Claims, 8 Drawing Sheets

| TASK NO. | OBJECT FILE | TASK NAME | DATA SIZE |
|---|---|---|---|
| 111 | a | A | 250 |
| 112 | b | B | 110 |
| 113 | c | C | 100 |
| 114 | d | D | 90 |
| 115 | a | A | 120 |
| 116 | c | C | 80 |
| 117 | d | D | 170 |
| 118 | e | E | 190 |
| 119 | a | A | 150 |
| ⋮ | ⋮ | ⋮ | ⋮ |
| 128 | c | C | 60 |
| 129 | e | E | 130 |
| 130 | a | A | 130 |

SYSTEM AND METHODS FOR BOOTING ELECTRONIC DEVICES

CLAIM FOR PRIORITY

This application claims priority from Japanese Patent Application No. 2008-094502, filed on Apr. 1, 2008, and which is fully incorporated by reference as if set forth herein.

FIELD OF THE INVENTION

The present invention relates to techniques for reducing boot time for an electronic device such as a personal computer (PC).

BACKGROUND OF THE INVENTION

Upon being powered on, a computer starts a startup process (also referred to as "bootstrap" or "boot"). First, an initial program, which is referred to as a BIOS power-on self test (POST) stored in BIOS ROM, is read into the main memory and executed. The initial program is used to diagnose or initialize a boot device.

Subsequently, the BIOS searches for a boot device storing a boot file. The boot file includes an operating system, a device driver, and an application program. As the boot device, normally a hard disk drive (HDD) is used. The BIOS loads the master boot record (MBR), which is stored in the first sector of the HDD, into the main memory and transfers the control to the MBR. The MBR searches for a partition allowed to be booted from the disk, loads a bootstrap loader located in its first sector (boot sector) into the main memory, and then transfers the control to the bootstrap loader. Thereafter, boot files are read into the main memory in sequential order subsequently to the bootstrap loader.

The operating system (OS), which implements preemptive multitasking, implements preemptive task switching also during boot. The OS creates a plurality of processes and threads in order to read a boot file from the HDD during boot. The OS dispatches each process to a processor in a given algorithm. The dispatched process is performed in the processor for a given time slice and then preempted, so that a subsequent process is dispatched. In the latter half of the boot, the number of simultaneously existing processes increases and thus a long seek time occurs in the HDD, thereby lowering the boot performance and causing a delay in boot time.

Although there is a method of storing a single boot image into the HDD and completing the boot in a short time to prevent an occurrence of redundant seek operations, the application of the method is limited to particular OSs. In addition, there is also a method of using a solid state drive (SSD) as the boot device, but the method is limited in the capacity and cost. Further, there is a method of defragging the boot files stored in the HDD to rearrange the boot files in such a way that a seek does not easily occur. Windows™ operating system has a so-called prefetch function in order to reduce the startup time by omitting redundant page faults and seek operations.

This function is to trace booting program operations in the previous and before booting times to check the access statuses of the files in the HDD and then to prefetch a given file in the next and subsequent booting times on the basis of the result. An access log is recorded for each file and stored in a given directory. Each file contains records of access pattern data to the HDD with respect to each program and the file is prefetched into the main memory during boot on the basis of the access log.

U.S. Pat. No. 6,073,232 teaches a technique of prefetching a boot-related program in a prefetch table read from the HDD on startup in order to reduce boot time. The prefetch table stores the location and size of the program and allows prefetch setting using a flag. Japanese Patent Application Publication No. 2007-241927 and Japanese Patent Application Publication No. Sho 64-76314 (1989-76314) each teach a technique of prefetching data including data subsequent to a read request in the case where the size of the read request from the host is equal to or greater than a given value. Japanese Patent Application Publication No. 2001-350669 teaches a technique of determining an amount of data to be cached based on a statistical process. Japanese Patent Application Publication No. 2002-207635 teaches a technique of setting a prefetch amount by comparing a request transfer rate from the host with a data reading rate from an optical disk. U.S. Pat. No. 6,073,232, Japanese Patent Application Publication No. 2007-241927, Japanese Patent Application Publication No. Sho 64-76314 (1989-76314), Japanese Patent Application Publication No. 2001-350669, and Japanese Patent Application Publication No. 2002-207635 are all incorporated by reference here.

Based on the forgoing, there is a need to provide a boot method that reduces boot time over and above the conventional approaches described above.

SUMMARY OF THE INVENTION

At least one presently preferred embodiment of the invention provides an apparatus, a system and program storage device for employing a boot method that reduces boot time. Accordingly, the invention to provides a boot method capable of reducing boot time even in the case of a change in the configuration of boot files. The invention provides a method of booting from a hard disk drive in a computer equipped with a multitasking operating system. In the boot, the boot driver observes a plurality of tasks created and sequentially executed to be read from the hard disk drive to the main memory. Subsequently, the boot driver selects a prefetch boot file from the plurality of observed tasks. The boot driver fills the selected prefetch boot file into a boot cache in the main memory and loads the boot file, read out after the filling, from the boot cache. This eliminates resource competition that may occur in reading out the boot file, thereby reducing the boot time.

In summary, one aspect of the present invention provides a method comprising: determining at least one boot file that when prefetched will optimally reduce delay in booting a multitasking operating system, the determining further comprising observing a plurality of tasks created and sequentially executed to be loaded from a hard disk drive; filling a boot cache with the at least one boot file; and loading the at least one boot file, read out after the filling step, from the boot cache.

Another aspect of the present invention provides an apparatus comprising: a processor; a tangible program storage device configured to store a program of instructions that when executed by the processor enable the apparatus to: determine at least one boot file that when prefetched will optimally reduce delay in booting a multitasking operating system via observing a plurality of tasks created and sequentially executed to be loaded from a hard disk drive; fill a boot cache with the at least one boot file; and load the at least one boot file, read out after filling, from the boot cache.

A further aspect of the present invention provides a program storage device readable by machine, tangibly embodying a program of instructions executable by a processor of the machine to: determine at least one boot file that when prefetched will optimally reduce delay in booting a multitasking operating system via observing a plurality of tasks created and sequentially executed to be loaded from a hard disk drive; fill a boot cache with the at least one boot file; and load the at least one boot file, read out after filling, from the boot cache.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE INVENTION

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

In the above-described Windows™ operating system function, it is possible to reduce the startup time in the second and subsequent boots, while it is impossible to reduce the startup time in the first boot for collecting access logs. Moreover, in a series of boot files, the boot file type, the starting sequence, and other aspects of the configuration will be frequently changed due to an update of the device driver, an addition of a patch program, and an addition of an application. If a change occurs in the configuration of the boot files, the previously created boot logs are insufficient to cope with the change. In order to reduce the boot time by prefetching the file without creating access logs of the boot files, there is a need for a new method of selecting a file to be prefetched.

Therefore, an embodiment of the present invention provides a boot method of reducing boot time. An embodiment of the present invention provides a boot method capable of reducing boot time even in the case of a change in the configuration of boot files. An embodiment of the present invention also provides a computer and a computer program for implementing the boot method.

According to an embodiment of the present invention, there is provided a method of booting from a hard disk drive in a computer equipped with a multitasking operating system. The hard disk drive may be either integrated with the computer or separated from the computer. In the boot, the boot driver observes a plurality of tasks created and sequentially executed to be read from the hard disk drive to the main memory. Subsequently, the boot driver selects a prefetch boot file from the plurality of observed tasks.

The boot driver fills the selected prefetch boot file into a boot cache in the main memory and loads the boot file, read out after the filling, from the boot cache. This eliminates resource competition that may occur in reading out the boot file, thereby reducing the boot time. The boot file may be entirely filled into the boot cache or may be partially filled, in the case of an insufficient capacity of the boot cache. If the boot file is partially filled, it is possible to fill the remaining part of the file into the boot cache when the boot file is selected again as a prefetch boot file with the progress of boot level.

The prefetch boot file may be selected by calculating a proportion of the number of tasks reading the same boot file to a predetermined number of tasks. The prefetch boot file may be selected by comparing the size of one boot file with the total size of a plurality of remaining boot files in the predetermined number of observed tasks. Due to a limit of the capacity of the boot cache, it is possible to select a prefetch boot file effective for eliminating resource competition by using the above method. The plurality of remaining boot files may be selected as prefetch boot files on the basis of the above comparison result.

It is possible to select a boot file or boot files exceeding a predetermined size as the prefetch boot file. The boot file having a large size is likely to increase in the number of tasks executing the readout and thereby likely to cause resource competition with other tasks, and therefore the filling into the boot cache is effective for reducing the boot time. The resource competition frequently occurs with preceding or following tasks among the sequentially executed tasks. Therefore, it is possible to select a plurality of boot files read by tasks selected alternately out of a plurality of sequentially executed tasks as the prefetch boot file. Due to a change in the state of the resource competition between the boot files with the progress of the boot, it is possible to cope with the change by performing the observation for selecting the prefetch boot file at regular time intervals during the boot or for each size of the read boot file. In this instance, the boot cache is updated in an algorithm such as LRU, FIFO, or the like so as to cope with the progress of the boot.

The prefetch boot file may be selected on the basis of a result of calculating an average read size per unit time of the loaded boot file for each predetermined elapsed time. In this instance, it is possible to calculate a long-term moving average and a short-term moving average of the average read size and to set the prefetch timing to a timing when the short-term moving average falls below the long-term moving average. It is possible to stop the prefetch of the boot file based on the long-term moving average and the short-term moving average when the short-term moving average exceeds the long-term moving average.

The boot cache may be configured as a boot cache area in a part of the main memory and the boot driver may release the boot cache area after completing the boot. The boot driver may fill boot files, which are read by all tasks existing between two tasks reading the same file among continuous tasks registered in an executable queue, into the boot cache. The boot driver may fill boot files, which are read by a predetermined or more number of the same tasks existing in the plurality of tasks registered in the executable queue, into the boot cache.

According to the present invention, it is possible to provide a boot method of reducing boot time. Further, according to the present invention, it is possible to provide a boot method capable of reducing boot time even in the case of a change in the configuration of boot files. Still further, according to the present invention, it is possible to provide a computer and a computer program for implementing the boot method.

Computer Configuration

Figure 1:
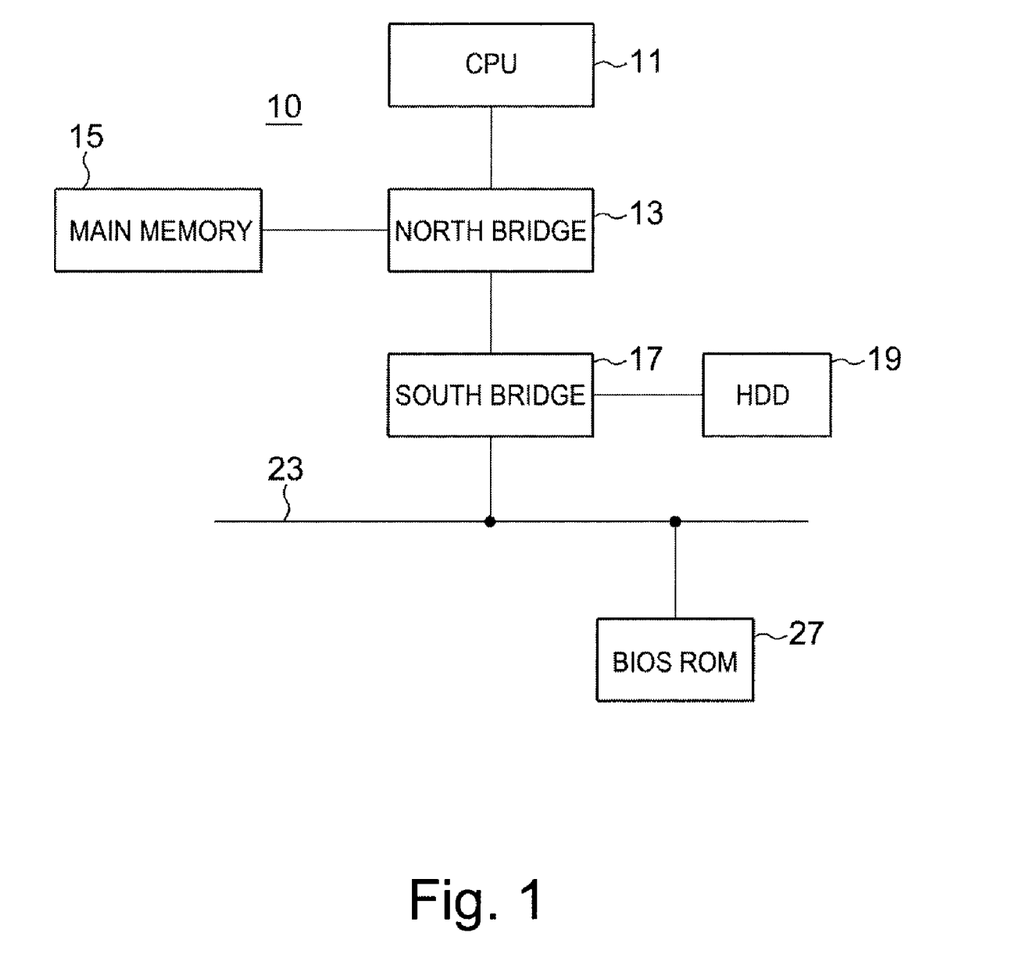
FIG. 1 is a block diagram illustrating a schematic hardware configuration implemented in a computer.

Referring to FIG. 1, there is shown a block diagram illustrating a schematic hardware configuration of a computer 10. A CPU 11 is an arithmetic processing unit, which implements the central function of the computer 10, runs an OS, a BIOS, a device driver, or an application program. The CPU 11 controls a north bridge 13 and devices connected to the north bridge 13 via various buses. The north bridge 13 includes a memory controller function for controlling access operations to a main memory 15 and a data buffer function for absorbing a difference in data transfer rate between the CPU 11 and any other device.

Figure 4:
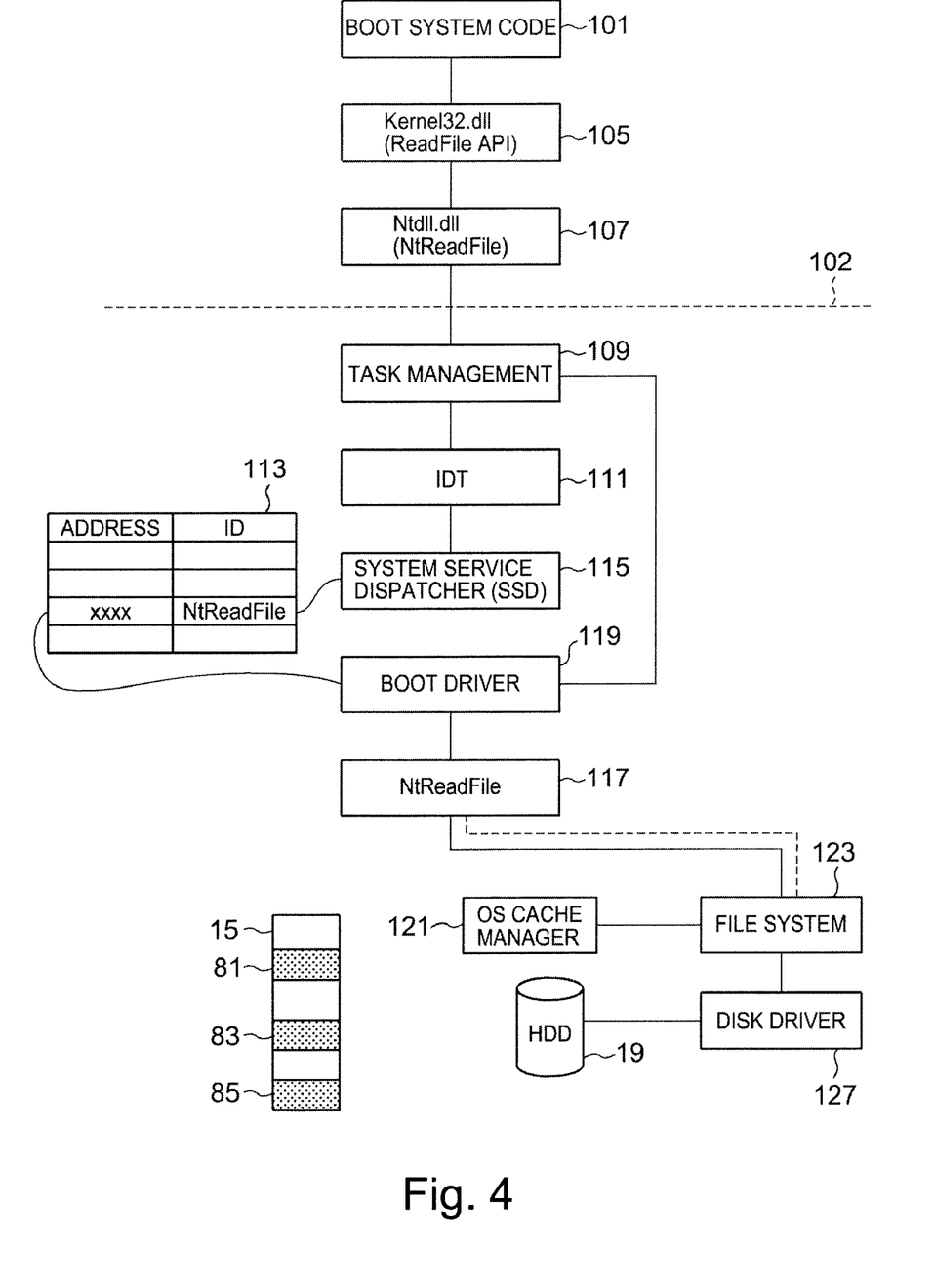
FIG. 4 is a block diagram for explaining the configuration for executing boot.

The main memory 15 is a volatile RAM which is used as a read-in area for a program executed by the CPU 11 and as a work area for writing processing data therein. The main memory 15 has an OS cache area 85 for implementing an OS cache function as shown in FIG. 4, a boot cache area 83 for providing a cache function of the present invention, and a load area 81. The boot cache area 83 may be configured as a dedicated memory, instead of a part of the main memory 15. The boot cache area 83 is located in an OS kernel area and its capacity is limited. During boot, the CPU 11 reads out each boot file to the load area 81, which is an execution area in the main memory 15. Reading the boot file to an address in an executable area of the main memory 15 from a HDD 19 is referred to as loading.

A south bridge 17, which is connected to the north bridge 13, has interfaces and PCI buses of various peripheral I/O devices and ports for PCI-Express buses. The south bridge 17 is connected to the HDD 19. The HDD 19 stores a boot driver 119 (See FIG. 4), which is a software program according to this embodiment, in addition to known programs such as the OS, the device driver, and the application. The OS stored in the HDD 19 performs preemptive multitasking.

Moreover, the south bridge 17 is connected to a legacy device conventionally used for a notebook PC 10 or to a device that does not require fast data transfer via the PCI bus or an LPC bus 23. The LPC bus 23 is connected to a BIOS ROM 25. The BIOS ROM 25 is a nonvolatile memory capable of electrically rewriting memory contents. The BIOS ROM 25 stores a power-on self test (POST) which tests and initializes hardware, a peripheral device control code for controlling input and output operations for accessing the boot device under the BIOS control, a utility for managing the temperature of a power supply and of the inside of a housing, and a password authentication code for use in authenticating a password.

Task State Transition

Figure 2A:
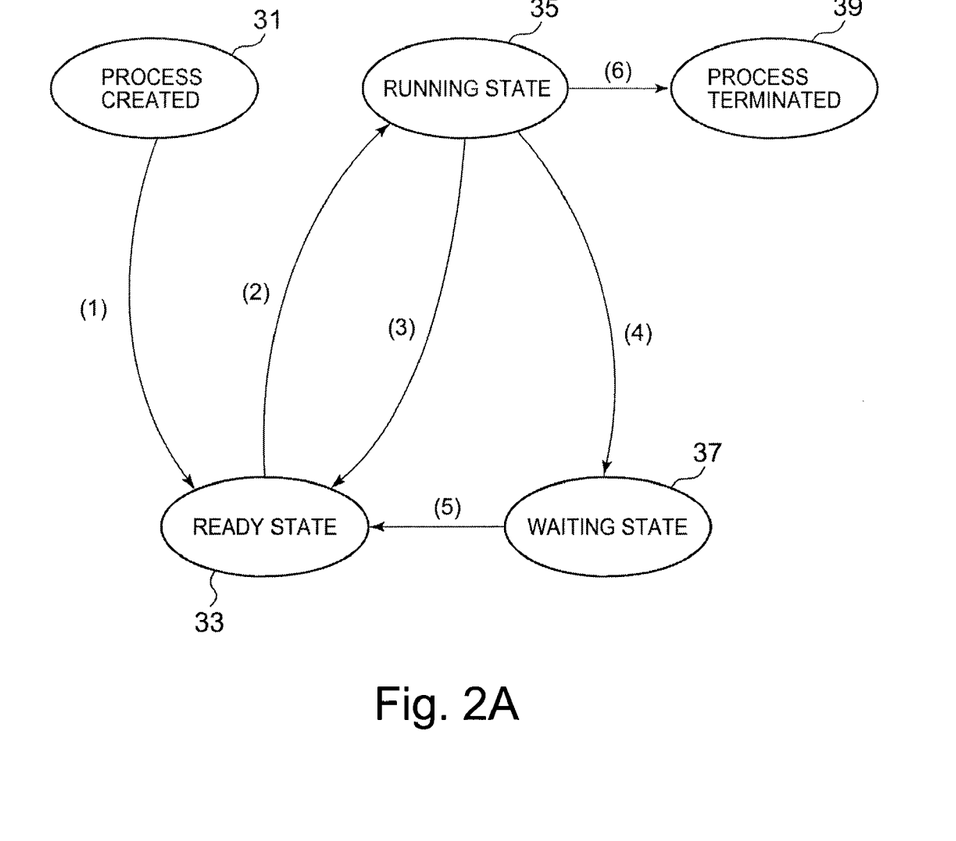
FIG. 2 is a diagram for explaining task states.
Figure 2B:
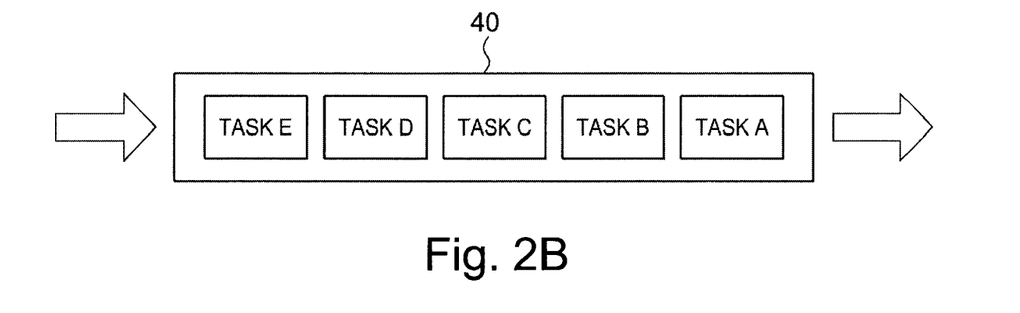

FIG. 2A is a state transition diagram illustrating a state where the multitasking OS manages tasks, and FIG. 2B is a diagram illustrating a state where a task control block (TCB) is registered in an executable queue. In this specification, the term "task" is used to mean both or one of a process and a thread. Upon the start of booting, a task for loading a boot file is created.

In the task management, the OS allocates required resources and creates tasks to read out the boot file. The resources include the HDD 19 storing the boot file. In the preemptive multitasking, when loading a specific boot file, the OS does not read out the entire boot file at a time, but the readout of the boot file is divided into a plurality of tasks to be read out alongside the execution in parallel with tasks for reading out another boot file. If one task is executed, a part of the boot file is written into the load area 81 of the main memory and then the plurality of tasks are executed to read out the same boot file, by which the entire boot file is written into the load area 81. The preemptive multitasking provides a user with a comfortable computer operating environment such as a parallel operation due to less resource competition after the completion of booting, but rather causes a delay in boot time during boot as described later.

The tasks are basically managed by the OS in one of the states: task created 31, ready state 33, running state 35, waiting state 37, and task terminated 39. The task is composed of information indicating the state of the program under execution and of the CPU 11. The OS manages tasks in a TCB data structure. The TCB is composed of a processor state, a task priority, time slice information, a task ID, device information and the like. The processor state is information on the states of a register, a stack, and a program counter when the CPU 11 interrupts the task and is also referred to as a context. The task priority is information indicating the priority sequence of context switches among the tasks. The time slice information is information on the initial value of a time slice and the remaining time.

The term "time slice" means the maximum execution time allowed in a case where a task acquires a one-time execution right for the CPU 11. The task ID is a unique number assigned to each task. The device information is identification information of a device assigned to the task. The TCB includes various other information different according to the OS. The TCB created by the OS is registered in an executable queue 40 shown in FIG. 2B, which is allocated in a data area of the OS in the order of execution in various manners such as a round-robin or priority manner so as to be in the ready state 33 (Transition 1).

In this instance, five tasks of a task A, a task B, a task C, a task D, and a task E are registered in the executable queue 40, waiting to be executed by the CPU 11. An OS scheduler performs a context switch by causing the tasks to transition between the running state 35 and the ready state 33 (transition 2 and transition 3). The transition from the ready state 33 to the running state 35 is referred to as "dispatch," and the transition from the running state 35 to the ready state 33 is referred to as "preempt." The scheduler, which performs preemptive multitasking, sequentially executes the task A to the task E by controlling the tasks such as forcibly preempting the execution right of the CPU 11 to the task A to return the task A to the last position of the executable queue 40, for example, after an elapse of the time slice assigned to the running task A, and then causing the next task B to transition to the running state 35.

If it is recognized that the task that has moved into the running state 35 is disabled because a device required for the execution of the task is removed or fails, the scheduler causes the task to transition to the waiting state 37 (transition 4), and the OS registers the TCB in a waiting queue reserved in the OS data area. When the device assigned to the task registered in the waiting queue is enabled, the device interrupts the CPU 11 via the OS to notify the task management and then the task management causes the task to transition from the waiting state 37 to the ready state 33 and registers the TCB in the executable queue 40. Thereafter, the task transitions to the running state 35 on the basis of the scheduler algorithm and then executed by the CPU 11. After the completion of loading the specific boot file, the task created to load the boot file terminates and the task management causes the task to transition to the state of the task terminated 39 (transition 6).

Description of Causes of Delay in Boot Time

Figure 3A:
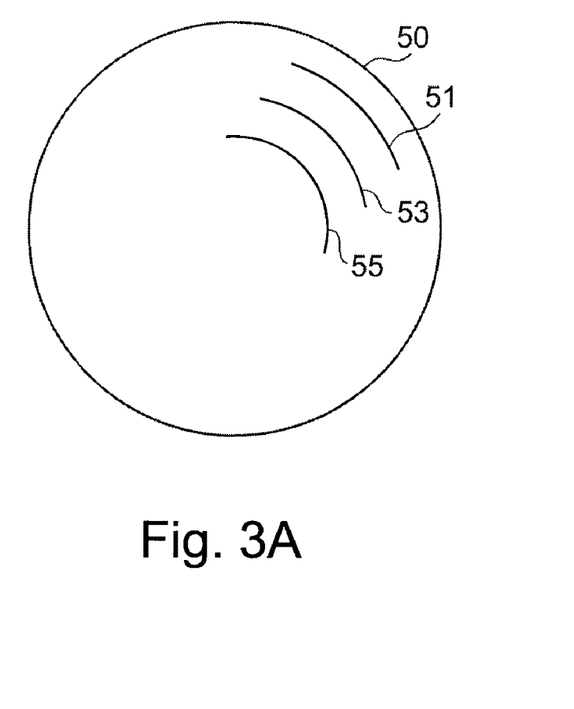
FIG. 3 is a diagram for explaining a cause of a boot delay.

Referring to FIG. 3, there is shown a diagram for explaining a cause of delay in boot time in preemptive multitasking. FIG. 3A shows a state where boot files 51, 53, and 55 are respectively recorded into different tracks of a disk 50 of the HDD 19. To load the boot files 51, 53, and 55, the head of the HDD 19 needs to move to the tracks to read the boot files. One boot file is normally stored in one track continuously and, if necessary, stored in an adjacent track. Therefore, if it is possible to read out one boot file continuously, redundant seek operations are prevented and thereby the delay does not occur in boot time.

Practically, however, if tasks for reading the boot files 51, 53, and 55 simultaneously exist and are registered in the executable queue 40, useless seek time occurs since the head moves between the tracks, which causes a delay in boot time. Moreover, the execution of the boot files 51, 53, and 55 further creates tasks for reading out other boot files, which causes even more useless seek time. In the preemptive multitasking, when the task for reading out the boot file 51 is executed first, a task for reading out other boot files 53 and 55 is executed before the completion of reading out the entire boot file 51, and therefore useless seek time inevitably occurs.

In this regard, a study is made for the following cases: a case where the tasks are executed and read in the order of the boot file 51, the boot file 55, and the boot file 53; and a case where the tasks are executed and read in the order of the boot file 51, the boot file 53, and the boot file 55. In these cases, the seek time related to the moving distance in the former is longer than the latter. In this manner, the seek time depends on the task execution sequence for reading out the boot files even in loading the same boot files. The OS scheduler is not capable of determining the task execution sequence in consideration of the seek time. In the case of focusing on the seek time and selecting a boot file that causes a delay in boot time, it is necessary to check the task execution sequence and the storage location of the boot file on the track and it is difficult to check them unless actually boot is performed for logging. Moreover, even if it is possible to find a boot file that causes the delay in boot time once, a change, if any, in the configuration of a series of boot files makes the logs unavailable.

Therefore, to reduce the boot time, conventionally there is only a method of specifying the boot file that causes the delay in boot time in a stage where the boot is actually performed and then prefetching the boot file into the cache in the next and subsequent booting times. In contrast, an embodiment of the present invention, as described later, makes it is possible to reduce the boot time by specifying the boot file to be prefetched and efficiently caching the boot file in a boot cache having a limited capacitor, focusing on the point that the delay in boot time is caused not only by the seek time, but also by resource competition related to one boot device such as the HDD 19.

Along with the progress of the boot, a lot of programs are executed and new tasks are created to read out files and the files further create new tasks to read out other files, which thereby increases the number of tasks registered in the executable queue 40. Normally, one HDD 19 is used for the (OS) boot first and the HDD 19 is capable of processing only one input or output at a time. Therefore, in the case where a plurality of tasks are registered in the executable queue 40 in multitasking and make output requests to the HDD 19 simultaneously, the tasks enter the wait state for output processing except one of the tasks and so-called resource competition occurs.

Figure 3B:
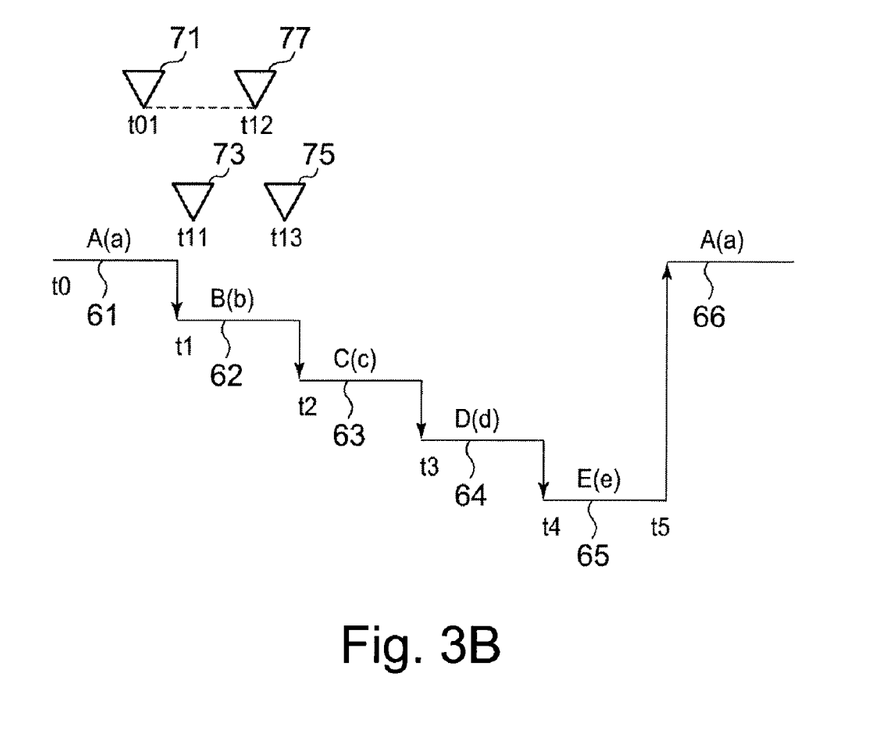

Referring to FIG. 3B, there is shown a diagram for explaining a state where the resource competition occurs with respect to an access to the HDD 19. The tasks A, B, C, D, and E for loading boot files a, b, c, d, and e exist simultaneously and are registered in the executable queue 40 and then executed sequentially in time slices 61, 62, 63, 64, 65, and 66. The task A is executed in the time slices 61 and 66. Each time slice is set as a certain time period, and after the given time slice is expended in each task, the execution right of the CPU 11 is transferred to the next task independently of the processing status.

In each task, an application program interface (API) function is invoked to request the reading of the boot file. If the loading completes before the end time t1 of the time slice 61 and the HDD 19 is released from the task A when the task A makes a read request 71 for a part of the boot file a to the HDD 19 at time t01, no resource competition occurs. Therefore, when the task B makes a read request 73 for a part of the boot file b to the HDD 19 at time t11, the HDD 19 is accessible and thus the task B is executed without waiting time. If, however, a read request to a disk driver 127 of the HDD 19 made by the task A completes before the time t1, the read request remains uncanceled even if not receiving the notice of the output completion from the disk driver 127 before the time t1 and further a task switch is performed for the task B at time t1.

Thereafter, the task B loads a part of the boot file a having been read by the read request 71 made by the task A in a location specified by the task A, and therefore the read request 71 completes by an output completion notice 77 sent from the disk driver 127 at time t12 of the time slice 62. Therefore, when the task B makes a read request 73 for a part of the boot file b from the HDD 19 at time t11, the HDD 19 is processing the read request 71 for the task A and therefore the task B is placed in the waiting state for the processing. Thereafter, if the task B makes a read request 75 for a part of the boot file b at time t13 and the read request 75 does not complete at time t2, the read request 75 is canceled and then the read request 75 is processed again when the task B is dispatched next time.

As described above, in the time slice 62 for the task B, wasteful time based on the resource competition occurs, which leads to a delay in boot time. This type of resource competition causes a delay in boot time different from seek time. In this case, the prefetch of the boot files b, c, d, and e in the boot cache area 83 eliminates the delay in boot time caused by the competition. The resource competition normally occurs between tasks executed almost simultaneously judging from the I/O wait time in the time slices, and therefore alternatively it is possible to eliminate the delay in boot time by one of the tasks executed almost simultaneously that reads out the boot file from the boot cache area 83.

Configuration for Executing Boot

Referring to FIG. 4, there is shown a block diagram for explaining the configuration for executing boot. In the block diagram shown in FIG. 4, only main software and hardware related to boot are shown, illustrating Windows™ operating system functions. Note that, however, the present invention is not limited to a case where the OS is a Windows™ operating system, but the present invention is also applicable to any other known OS within the scope of the present invention.

In FIG. 4, elements other than the boot driver 119 and the boot cache area 83 are well-known elements. The software described in the upper part of a line 102 operates in user mode of a processor 11 and the software described in the lower part operates in kernel mode. A boot system code 101 is executed first after the control is transferred from the BIOS to the OS to load the next boot file. In a bootstrap method, a boot file read earlier reads the next boot file and thus boot files are sequentially loaded into the main memory.

Kernel32.dll, which is a part of the Windows™ subsystem dynamic link library (DLL), converts a call to an open a Windows API function to a call to a closed kernel mode system service. For example, if the boot file loaded earlier calls a ReadFile API function open to an application in order to read the next boot file from the HDD 19 to the main memory 15, an internal function called NtReadFile implemented in closed Ntoskrnl.exe is called to load data from the HDD 19.

Ntdll.dll is a support library that provides a function for using the subsystem DLL. Ntdll.dll is composed of an interface function (System Service Dispatch Stub) that can be called from user mode and an internal support function such as the NtReadFile function used by the subsystem DLL. Task management 109 includes the executable queue 40 and the waiting queue to manage the tasks as described with reference to FIG. 2. The task management 109 retains TCB information of a task created for the ReadFile API function called to load the boot file.

An interrupt dispatch table (IDT) 111 is developed in the main memory 15 by the OS, and the boot system code 101 and the boot file perform a software interrupt to store an address for use in shifting to a given system service into each entry. For example, with setting a system service number in the EAX register of the CPU 11 and specifying INT 0x2e (hexadecimal number) for an entry index, it is possible to switch the control of the processor 11 from user to kernel mode by executing a system service dispatcher (SSD) 115, which is a system service of the address stored in the corresponding entry.

The SSD 115, which is a part of Ntoskrnl.exe, copies an argument (also referred to as a parameter) of a caller code from a user mode stack of a thread to a kernel mode stack. The SSD 115 executes a system service called with reference to the entry of a system service dispatch table (SSDT) 113. The SSDT 113 stores system service IDs and first addresses of the codes describing the corresponding system services.

For example, in one entry, the SSDT 113 stores information indicating the NtReadFile function as the ID and stores an address in the main memory 15 where an actual code of the NtReadFile function 117 is stored as the address. The NtReadFile function 117 is a part of Ntoskrnl.exe. The configuration of the boot driver 119 will be described later with reference to FIG. 5. The file system 123 is software provided by the OS in order to manage data stored in the HDD 19. The file system 123 creates a file allocation table (FAT) and a directory to manage the file recording, read, delete, move, or other operations related to the HDD 19.

An OS cache manager 121 is software provided by the OS to improve an access performance to the HDD 19. The OS cache manager 121 prefetches and fills data into the OS cache area 85 so that it is possible to process a ReadFile API function or a WriteFile API function, when called for the HDD 19, without accessing the HDD 19 every time. The OS cache manager 121 manages the file filling and flushing to the OS cache area 85 on the basis of a unique algorithm for an access to the HDD 19 from all kinds of software executed in the computer 10. Caching means to fill new data into the boot cache area 83 or the OS cache area 85 or to flush old data at that time. The disk driver 127 is software for controlling the operation and data transfer of the HDD 19.

Configuration of Boot Driver

Figure 5:
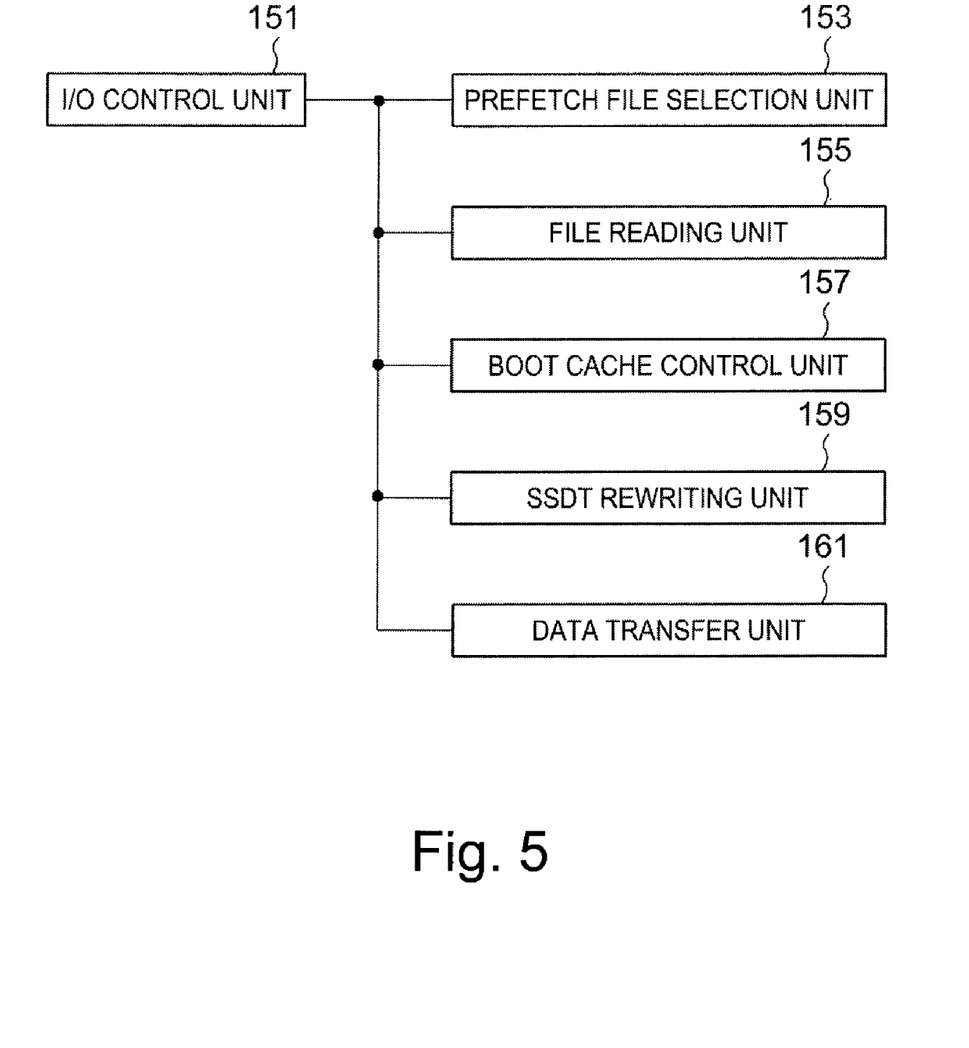
FIG. 5 is a functional block diagram illustrating a main configuration of a boot driver.

Referring to FIG. 5, there is shown a functional block diagram illustrating the main configuration of the boot driver 119. An I/O control unit 151 implements an interface function between outside and inside elements. A prefetch file selection unit 153 is capable of performing a plurality of controls according to a first method or a third method described below when the ReadFile API function is called from the boot system code 101 or a boot file read subsequently thereto.

In the first method, the prefetch file selection unit 153 selects a boot file to be read by managing a prefetch queue xxx of a read request acquired by hooking the NtReadFile function and identifies related tasks by inquiring of the task management 109 for the tasks each issuing a read request.

In the second method, the prefetch file selection unit 153 inquires of the task management 109 for information on tasks currently registered in the executable queue 40 and inquires of the file system 123 for the sizes of the boot files read by the tasks. Thereafter, the prefetch file selection unit 153 selects a boot file having a larger size than a given size as a boot file to be prefetched into the boot cache area 83.

In the third method, the prefetch file selection unit 153 selects the prefetch file by obtaining time information from the start of the boot from a known real time clock (RTC), accumulating the total size of the boot files which have been completely loaded before the time in the file reading unit 155, calculating an average read size of the boot files which have been completely loaded per unit time, calculating a long-term moving average and a short-term moving average of the average read size, and determining the start timing of the prefetch into the boot cache area 83 and the stop timing thereof.

A file reading unit 155 executes NtReadFile functions corresponding to all hooked ReadFile API functions. The file reading unit 155 executes the NtReadFile function whose argument is modified by a particular system task created for the prefetch boot file selected by the prefetch file selection unit 153 and executes the NtReadFile functions without modifying the arguments set by the already created tasks for the boot files other than the prefetch boot file selected by the prefetch file selection unit 153. The system task is a particular task operating only in kernel mode unlike the user mode task.

The file reading unit 155 is capable of reading all or most of the selected prefetch boot file into the boot cache area 83 in a short time by executing the particular system task. A boot cache control unit 157 caches the boot file read from the HDD 19 by the file reading unit 155 into the boot cache area 83 in a least recently used (LRU) method. A SSDT rewriting unit 159 rewrites an address corresponding to the ID, NtReadFile function in the SSDT 113, from the address of the NtReadFile function 117 to the address of the boot driver 119 when the boot driver 119 is loaded into the main memory 15 along with the OS.

Rewriting the address of the SSDT 113 from the address of the function previously set by the OS to the address of another code is referred to as "hooking the function." A data transfer unit 161 determines whether the boot cache area 83 contains the boot file of a task created by the task management 109 in response to the ReadFile API function that a precedent boot file called to load a subsequent boot file. If determining that the boot file is filled in the boot cache area 83, the data transfer unit 161 transfers the boot file to the load area 81 of the main memory 15. Unless determining that the boot file is filed in the boot cache area 83, the data transfer unit 161 passes process to the file reading unit 155 and the file reading unit 155 reads out the boot file from the HDD 19 by implementing the NtReadFile function. The configuration of the boot driver 119 shown in FIG. 3 is illustrative only, and it is alternatively possible to use any other configuration capable of implementing equivalent functions within the scope obvious to those skilled in the art.

First Method

The following describes a first presently preferred method for reducing the boot time in the computer 10 described with reference to FIG. 1 to FIG. 5. As described with reference to FIG. 3B, in a situation where two tasks for reading out one boot file and tasks for reading out other boot files between the two tasks are registered in the execution order, prefetching the boot files between the two tasks into the boot cache area 83 prevents an occurrence of resource competition in reading the series of boot files, thereby reducing the boot time. A method of detecting the boot files between the two tasks and determining the prefetched boot files will be described below.

Figure 6:
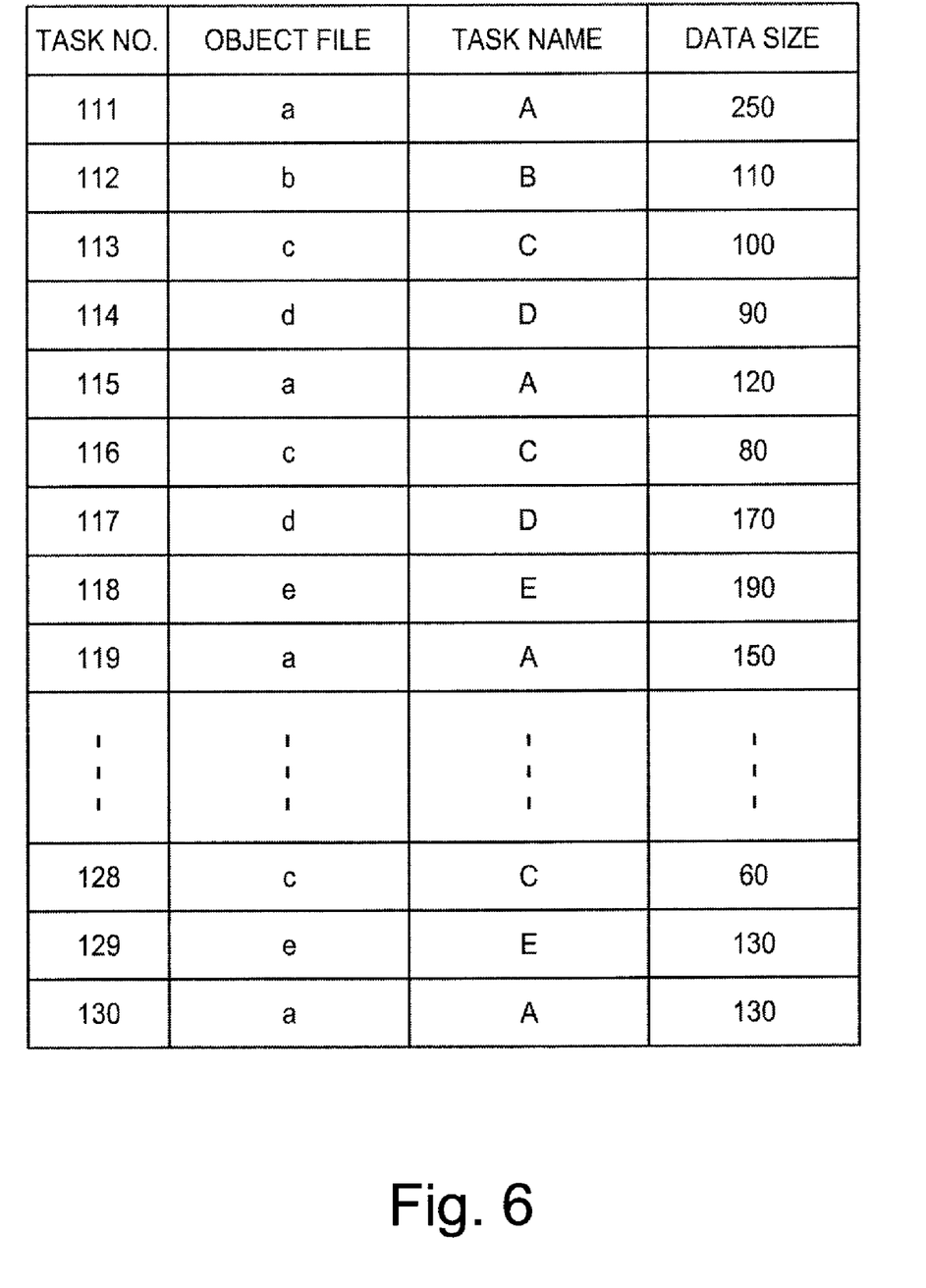
FIG. 6 is a diagram illustrating a state where a plurality of tasks are registered in an executable queue.

Referring to FIG. 6, there is shown a state where a plurality of tasks are registered in the executable queue 40. It is assumed that task numbers are assigned in the order of task creation and that the tasks are sequentially executed from the top of the list. Note that, however, the tasks may be registered in the executable queue 40 in the order different from the order of the task creation in some cases. The registration order depends on the algorithm of the OS scheduler. The timing when each task completes and terminates does not relate to the order of the task creation. An object file indicates the name of a boot file that the corresponding task reads into the load area 81 of the main memory 15 from the HDD 19 and a storage area in the HDD 19. A task name indicates the name of a task that reads out the object file, and a data size indicates the size of a part of the boot file read out by the corresponding task.

The prefetch file selection unit 153 inquires of the task management 109 at a given timing after the start of the boot and extracts approximately 20 continuous tasks to check whether there are, for example, two thirds or more of whole tasks having the same name. FIG. 6 shows a state where boot files a, b, c, d, and e are read out. In FIG. 6, it is assumed that tasks A, which read out the boot file a, occupy two thirds or more of whole tasks. A large number of tasks A having the same name means that it is likely that the boot time delays due to an occurrence of resource competition with other tasks between the tasks A.

If the size of the file a is greater than the total size of other files b, c, d, and e in the 20 tasks and smaller than the size of the boot cache area 83, the file a is prefetched into the boot cache area 83. Then, if the tasks which read the boot files a, b, c, d, and e exist in the executable queue 40 simultaneously, the boot file a is written into the load area 81 from the boot cache area 83. This eliminates the resource competition between the task A and other tasks preceding or following the task A, thereby reducing the boot time. The file a is large in size and therefore the task A is frequently dispatched due to a long task life time. Therefore, with previously filling the file a into the boot cache area 83, it is possible to frequently eliminate resource competition with the preceding and following tasks after the progress of the boot.

If, conversely, the size of the file a is smaller than the total size of other files b, c, d, and e and the total size of the files b, c, d, and e is smaller than the size of the boot cache area 83, the files b, c, d, and e are prefetched into the boot cache area 83. In addition, if the tasks which read the boot files a, b, c, d, and e exist in the executable queue 40 simultaneously, the boot files b, c, d, and e are written into the load area 81 from the boot cache area 83. This completely eliminates resource competition among the tasks A, B, C, d, and E, thereby reducing the boot time. The boot files b, c, d, and e are relatively small in file size, which leads to a short life time of the tasks B, C, D, and E, though high in frequency of eliminating resource competition during the life time.

As described above, the prefetch file selection unit 153 compares the size of the boot file read by the plurality of tasks having the same name with the total size of the boot files read by other tasks between the tasks having the same name to select prefetch boot files under the condition that the larger size is within the size of the boot cache area 83. Thereafter, the tasks are prefetched into the boot cache area 83 before the task execution, thereby enabling the elimination of access competition to the HDD 19.

Alternatively, it is possible to alternately select tasks among the plurality of sequentially executed tasks and then to fill the boot files read by the selected tasks as prefetch boot files into the boot cache area 83. For example, the boot files read out by the tasks of even or odd numbers are filled into the boot cache area 83 in FIG. 6, thereby enabling the tasks of task number 111 to task number 130 to be executed almost without any resource competition.

Figure 7:
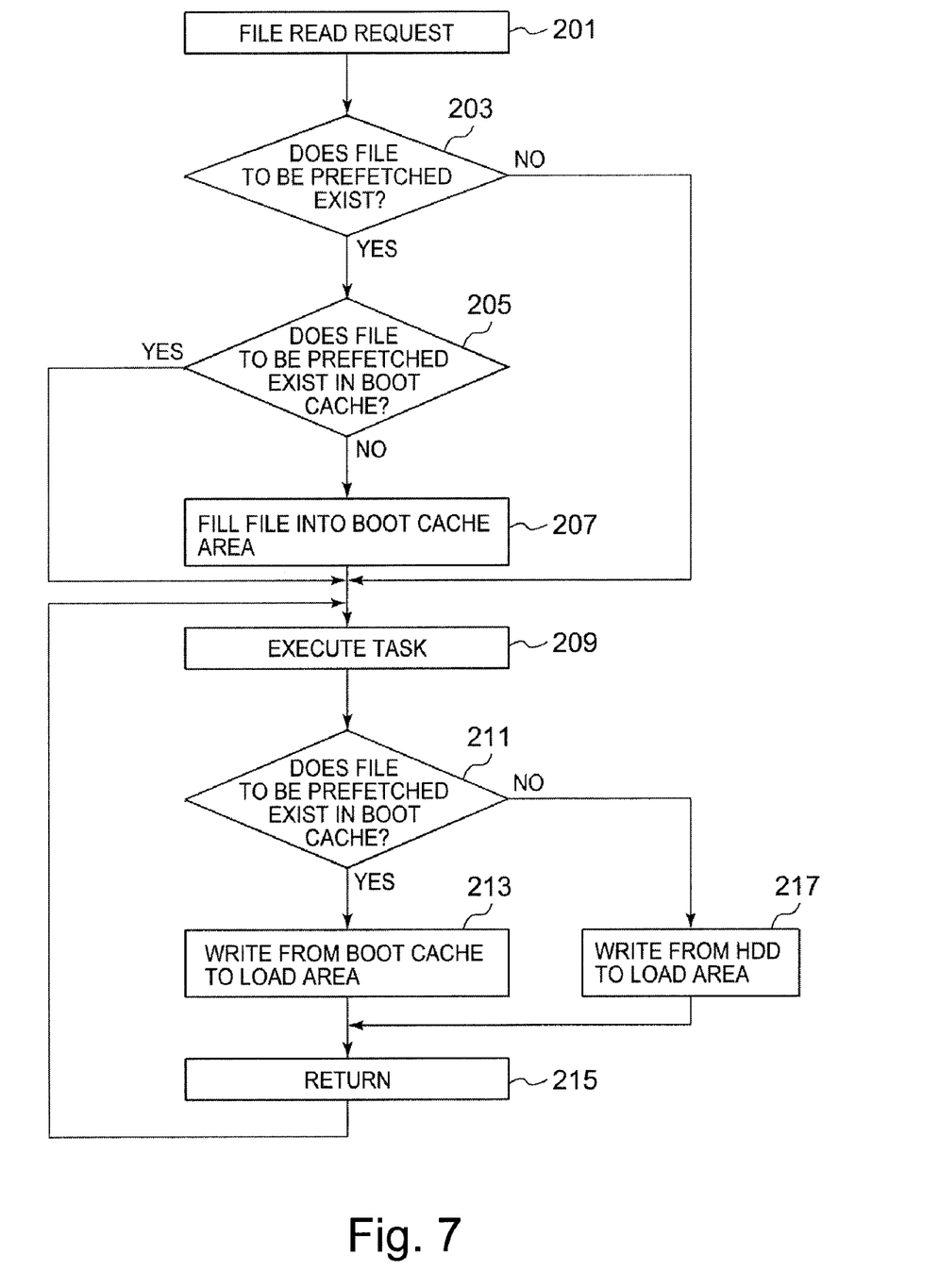
FIG. 7 is a flowchart illustrating a procedure for reducing boot time.

FIG. 7 is a flowchart showing the procedure for reducing the boot time in this method. In block 201, the computer 10 is turned on to execute BIOS ROM POST. Thereafter, the control proceeds to the MBR stored in the HDD 19 and the code of the boot sector. The boot system code 101 is executed first in the conventional procedure and then a task for loading a subsequent boot file is created. Then, the subsequent boot file is executed and thereafter a task for loading a further subsequent boot file is created. This process is then repeated until the boot completes in a sequential order. Each boot file calls the CreateFile API function and the ReadFile API function to issue a read request of a subsequent file to the HDD 19.

In the stage of completely loading the software shown in FIG. 4, the boot driver 119 starts the operation to start the procedure shown in FIG. 7. It is assumed that 20 tasks in FIG. 6 are observed at this certain time and the upper tasks are sequentially executed to load the boot file into the main memory 15. The ReadFile API function is called in each task, and its TCB is registered into the executable queue 40 and is waiting to be dispatched onto the CPU 11 by the scheduler. The boot driver 119 is loaded into the main memory 15 along with the OS in the initial stage of the boot, and the SSDT rewriting unit 159 rewrites the address in the main memory 15 having the ID, NtReadFile in the SSDT 113, from the first address of the NtReadFile function 117 to the first address of the boot driver 119 for hooking.

The OS cache manager 121 manages caching to the OS cache area 85 independently of caching to the boot cache area 83 using the boot driver 119. While pieces of the boot file are filled into the OS cache area 85 independently of the presence or absence of resource competition during boot, the effect on the reduction of the boot time is low. The address of the SSDT 113 is rewritten and therefore the boot driver 119 processes all ReadFile API functions called by the tasks.

In block 203, the prefetch file selection unit 153 manages a prefetch queue xxx of a read request obtained by hooking the NtReadFile function to select boot files read out in the method described with reference to FIG. 6 and to identify related tasks by inquiring of the task management 109 for the tasks issuing the read requests. After a boot file is loaded and executed, the boot file creates a task to read out a subordinate boot file, and the subordinate boot file further creates a task to read out a further subordinate boot file. This increases the number of tasks registered in the executable queue 40 along with the progress of the boot and causes a large number of resource competitions, thereby significantly increasing the delay in boot time. The first timing of performing the determination of block 203 may be set to the middle part of the entire boot time when the delay is significant.

If the prefetch file selection unit 153 determines that the prefetch queue xxx of the read request observed in block 203 does not contain any boot file to be prefetched, the control proceeds to block 209. If the prefetch file selection unit 153 determines that the prefetch queue xxx of the read request contains a prefetch boot file to be prefetched, the control proceeds to block 205. In block 205, the file reading unit 155 determines whether the prefetch boot file is filled in the boot cache area 83. If the prefetch boot file is filled in the boot cache area 83, the control proceeds to block 209.

Unless the prefetch boot file is not filled in the boot cache area 83, the control proceeds to block 207. If determining that the files b, c, d, and e exist as boot files to be prefetched in block 205, the file reading unit 155 creates a plurality of particular system tasks for reading the files b, c, d, and e to the boot cache area 83 and executes NtReadFile functions sequentially. For the arguments of the NtReadFile functions, addresses in the boot cache area 83 are specified. The system tasks are executed independently of user mode tasks created to perform the boot.

The system tasks have higher priorities and read out the entire boot file b first, and then read out the entire boot file c, and thereafter sequentially read out each boot file up to the boot file e by executing the NtReadFile functions. Although a seek is likely to occur in the HDD 19 in writing the boot files b, c, d, and e into the boot cache area 83, the boot files are read out in particular system threads and therefore the possibility of resource competition with a subsequent task is limited to tasks switching to a different task such as, for example, from the boot file b to the boot file c, by which the filling completes in a relatively short time.

If the file a is selected as the boot file to be prefetched in block 205, the file reading unit 155 reads out all or a part of the file a into the boot cache area 83 in the same procedure. In block 209, the task A of the task number 111 is dispatched and executed before long. At this point in the process, the boot files b, c, d, and e selected in consideration of an occurrence of resource competition are filled in the boot cache area 83. In block 211, the data transfer unit 161, which checked the NtReadFile function executed by the task A, determines whether the file a exists in the boot cache area 83.

The boot file a is not filled in the boot cache area 83 in block 207, and therefore the control proceeds to block 217, where the file reading unit 155 executes the NtReadFile function without modifying the argument to write a part (size 250) of the boot file a read by the task A from the HDD 19 into the load area 81. A task for a case of selecting no file to be prefetched in block 203 is also processed in block 217. Upon completion of the writing to the load area 81, the disk driver 127 notifies the task management 109 of the completion of the readout in block 215 and the control returns to block 209.

In block 209, the task B of the task number 112 subsequently registered in the executable queue 40 is dispatched to the CPU 11 and executed. The NtReadFile function of the task B is hooked, and the data transfer unit 161 of the boot driver 119 determines whether the boot file b to be read out exists in the boot cache area 83. The boot file b is filled in the boot cache area 83 in block 207, and therefore the data transfer unit 161 writes a part (size 110) of the boot file b to be executed by the task B of the task number 112 in block 213 at a given address of the load area 81 specified by the NtReadFile function from that position. Even if the task A is in the output waiting state of the HDD 19 when the task B of the task number 112 is executed, the boot file b is read from the boot cache area 83 and therefore no resource competition occurs.

Since the boot driver 119 does not issue a request for readout to the HDD 19 to the disk driver 127 when writing the boot file b into the load area 81, the task C of the task number 113, which is subsequently executed, is not placed in a resource waiting state. Therefore, also for the task C, a part of the boot file c is read from the boot cache area 83. The boot files b, c, d, and e are stored in the boot cache area 83, and therefore no competition occurs in the task B of the task number 112 to the task A of the task number 130, thereby reducing the boot time.

With the progress of the boot, tasks are sequentially created in order to load new boot files. In this embodiment, the determination of the block 203 is performed more than once until the boot terminates, at time intervals or at the time of satisfying the size of the readout boot files, thereby enabling the elimination of the competition in any stage of the boot. Moreover, even if a change occurs in the configuration such as the size of a boot file or the boot sequence, it is possible to reduce the boot time without creating the previous boot process logs.

The more the boot files are stored in the boot cache area 83, the more the boot files are read from the boot cache area 83 to the load area 81 and therefore the more the boot time is reduced. The boot cache control unit 157 caches the boot cache area 83 in LRU during boot. With the progress of the boot, the competing boot files change and therefore the boot cache area 83 caches new boot files accordingly. The boot cache area 83 is released as a normal memory area at the completion of the boot.

Second Method

The following describes a second presently preferred method for reducing the boot time. It is possible to use the second method instead of the first method or in addition to the first method. In the second method, block 203 of FIG. 7 is changed. As shown in FIG. 3B, if the size of the entire boot file a is large, dispatching and preempting are repeated more than once between the executable queue 40 and the CPU 11 until the task A for loading the boot file a completes and terminates. Therefore, as long as the boot file a is read from the HDD 19, resource competition to the HDD 19 occurs with subsequent tasks for each dispatching.

The frequency of resource competition increases as an increase in the number of time slices assigned to the task concerned, and the number of time slices assigned to the boot file increases as an increase in the file size. In the second method, the prefetch file selection unit 153 of the boot driver 119 checks the argument set to the NtReadFile function to be executed in a task and determines whether the size of the boot file to be read out is equal to or greater than a given value in block 203.

If the prefetch file selection unit 153 determines that the file size of the boot file a is equal to or greater than the given value, a special system task is created to write all or a part of the boot file a into the boot cache area 83 in block 207. At the time of executing a task for reading out the boot file a from then on, the boot file data is transferred from the boot cache area 83 to the load area 81, which thereby prevents an occurrence of resource competition to the HDD 19 with the tasks executed before or after the boot file a.

Third Method

Figure 8:
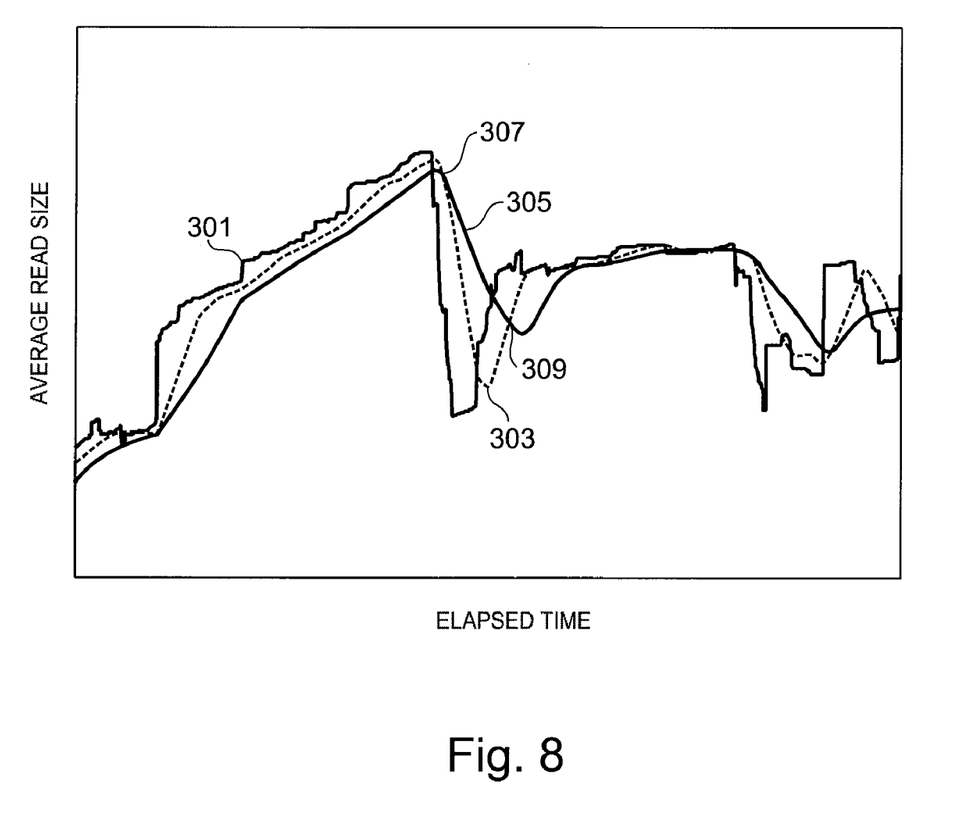
FIG. 8 is a graph illustrating an example of an elapsed time during boot and the size of boot files loaded per unit time.

The following describes a third presently preferred method for reducing the boot time. It is possible to use the third method in addition to both or one of the first and second methods. Referring to FIG. 8, there is shown a graph illustrating an example of an elapsed time during boot and the size (Mbps) of boot files loaded per unit time. A line 301 indicates an average read size per unit time of a boot file, a line 303 indicates a short-term moving average for each predetermined period relative to the line 301, and a line 305 indicates a long-term moving average for each predetermined period relative to the line 301.

An average read size per time complicatedly varies according to the types of readout boot files and the task execution order during boot. In the third method, the boot is determined to delay when the short-term moving average 303 is lower than the long-term moving average 305 at a crosspoint 307 and boot files to be read thereafter are prefetched into the boot cache area 83. If the prefetch file selection unit 153 of the boot driver 119 determines that the short-term moving average 303 is lower than the long-term moving average 305 in block 203 of FIG. 7, the file reading unit 155 fills the boot files read out by the tasks executed thereafter into the boot cache area 83 within the allowable range of the capacity thereof by creating a system task. The files filled into the boot cache area 83 may include files of tasks executed slightly before the task executed at the crosspoint 307.

While the third method is executed, the first and second methods are stopped. With the progress of reading the boot files from the boot cache area 83, the average read size per unit time increases. When the prefetch file selection unit 153 of the boot driver 119 determines that the short-term moving average 303 exceeds the long-term moving average 305 at a crosspoint 309 in block 203 of FIG. 7, the prefetch to the boot cache area 83 is stopped. Thereafter, it is possible to perform the first or second method by using the boot cache area 83.

While the present invention has been described in connection with certain preferred embodiments shown in the accompanying drawings, it is to be understood that the subject matter encompassed by the present invention is not limited to those specific embodiments shown in the drawings. Naturally, as long as the effects of the present invention are provided, any known configuration may be used.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The boot cache is preferably a tangible storage device.

Accordingly, elements of the present invention may be implemented on at least one computer running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. A method comprising:
   determining at least one prefetch boot file that when prefetched will optimally reduce delay in booting a multitasking operating system, the determining further comprising:
      observing a plurality of tasks created and sequentially executed to be loaded from a hard disk drive; and
      selecting the at least one prefetch boot file from the plurality of tasks;
   filling a boot cache with the at least one prefetch boot file; and
   loading the at least one prefetch boot file, read out after the filling step, from the boot cache during booting of the multitasking operating system.

2. The method according to claim 1, wherein the determining step further comprises:
   selecting boot files sequenced in an executable queue between two tasks reading out a same boot file as the at least one prefetch boot file.

3. The method according to claim 1, wherein the determining step further comprises:
   determining if a boot file exceeds a predetermined size value;
   wherein, when it is determined that a boot file exceeds the predetermined size value, the boot file exceeding the predetermined size value is prefetched into the boot cache as the at least one prefetch boot file.

4. The method according to claim 1, wherein the determining step further comprises:
- determining an average read size per time for the at least one prefetch boot file;
- determining a short-term moving average and a long-term moving average for the at least one prefetch boot file relative to a first cross point; and
- determining the at least one prefetch boot file based on the short-term moving average and the long-term moving average;
- wherein if the short term moving average is lower than the long term moving average, the at least one prefetch boot file comprises boot files executing after the first cross point.

5. The method according to claim 4, wherein, when it is determined that the short-term moving average exceeds the long-term moving average at a second cross point, a prefetch to the boot cache is stopped.

6. The method according to claim 1, wherein the filling step comprises filling an entire boot file.

7. The method according to claim 1, wherein a boot driver releases the boot cache after completing the boot.

8. The method according to claim 1, wherein the at least one prefetch boot file comprises boot files that are read by at least a predetermined number of tasks existing in a plurality of tasks registered in an executable queue; and
- wherein the filling step comprises filling into the boot cache the boot files that are read by at least the predetermined number of tasks existing in the plurality of tasks registered in the executable queue.

9. The method according to claim 1, wherein the plurality of tasks are observed by a boot driver loaded into memory during an initial stage of booting the multitasking operating system.

10. The method according to claim 1, wherein the plurality of tasks are observed at regular time intervals during booting of the multitasking operating system.

11. The method according to claim 1, wherein the boot cache is updated during booting of the multitasking operating system utilizing a least recently used (LRU) process.

12. An apparatus comprising:
- a processor;
- a tangible program storage device configured to store a program of instructions that when executed by the processor enable the apparatus to:
- determine at least one prefetch boot file that when prefetched will optimally reduce delay in booting a multitasking operating system, determining at least one prefetch boot file comprising:
  - observing a plurality of tasks created and sequentially executed to be loaded from a hard disk drive; and
  - selecting the at least one prefetch boot file from the plurality of tasks;
- fill a boot cache with the at least one prefetch boot file; and
- load the at least one prefetch boot file, read out after filling, from the boot cache during booting of the multitasking operating system.

13. The apparatus according to claim 12, wherein the program of instructions further enable the apparatus to select boot files sequenced in an executable queue between two tasks reading out a same boot file as the at least one prefetch boot file.

14. The apparatus according to claim 12, wherein the program of instructions further enable the apparatus to determine if a boot file exceeds a predetermined size value;
- wherein, when it is determined that a boot file exceeds the predetermined size value, the boot file exceeding the predetermined size value is prefetched into the boot cache as the at least one prefetch boot file.

15. The apparatus according to claim 12, wherein the program of instructions further enable the apparatus to:
- determine an average read size per time for the at least one prefetch boot file;
- determine a short-term moving average and a long-term moving average for the at least one prefetch boot file relative to a first cross point; and
- determine the at least one prefetch boot file based on the short-term moving average and the long-term moving average;
- wherein if the short term moving average is lower than the long term moving average, the at least one prefetch boot file comprises boot files executing after the first cross point.

16. The apparatus according to claim 15, wherein, when it is determined that the short-term moving average exceeds the long-term moving average at a second cross point, a prefetch to the boot cache is stopped.

17. The apparatus according to claim 12, wherein the program of instructions further enable the apparatus to fill an entire boot file.

18. The apparatus according to claim 12, wherein the program of instructions further enable the apparatus to release the boot cache after completing the boot.

19. The apparatus according to claim 12, wherein:
- the at least one prefetch boot file comprises boot files that are read by at least a predetermined number of tasks existing in a plurality of tasks registered in an executable queue;
- wherein the program of instructions further enable the apparatus to fill into the boot cache the boot files that are read by at least the predetermined number of tasks existing in the plurality of tasks registered in the executable queue.

20. A program storage device readable by machine, tangibly embodying a program of instructions executable by a processor of the machine to:
- determine at least one prefetch boot file that when prefetched will optimally reduce delay in booting a multitasking operating system via, determining at least one prefetch boot file comprising:
  - observing a plurality of tasks created and sequentially executed to be loaded from a hard disk drive; and
  - selecting the at least one prefetch boot file from the plurality of tasks;
- fill a boot cache with the at least one prefetch boot file; and
- load the at least one prefetch boot file, read out after filling, from the boot cache during booting of the multitasking operating system.

* * * * *